(12) United States Patent
Au et al.

(10) Patent No.: US 10,582,756 B2
(45) Date of Patent: Mar. 10, 2020

(54) REINFORCED TEXTILE STRAP

(71) Applicant: MRM HK Limited, Hong Kong (HK)

(72) Inventors: Yim Cheung Au, Hong Kong (HK); Jensen Pauwels, Hong Kong (HK)

(73) Assignee: MRM HK Limited, Hong Kong (HK)

( * ) Notice: Subject to any disclaimer, the term of this patent is extended or adjusted under 35 U.S.C. 154(b) by 338 days.

(21) Appl. No.: 14/925,674

(22) Filed: Oct. 28, 2015

(65) Prior Publication Data

US 2017/0095062 A1    Apr. 6, 2017

Related U.S. Application Data

(60) Provisional application No. 62/237,308, filed on Oct. 5, 2015.

(51) Int. Cl.
*A45F 3/14* (2006.01)
*B32B 5/02* (2006.01)
(Continued)

(52) U.S. Cl.
CPC .............. *A45F 3/14* (2013.01); *A45C 13/20* (2013.01); *A45C 13/30* (2013.01); *B32B 5/024* (2013.01); *B32B 5/04* (2013.01); *B32B 5/06* (2013.01); *B32B 5/08* (2013.01); *B32B 5/10* (2013.01); *B32B 5/26* (2013.01); *D03D 1/0041* (2013.01); *D03D 15/02* (2013.01); *A45F 2003/142* (2013.01); *B32B 2250/03* (2013.01); *B32B 2250/20* (2013.01); *B32B 2250/40* (2013.01); *B32B 2250/44* (2013.01); *B32B 2262/02* (2013.01); *B32B 2262/0269* (2013.01); *B32B 2262/103* (2013.01); *B32B 2262/106* (2013.01);
(Continued)

(58) Field of Classification Search
CPC .. D03D 1/0005; D03D 1/0094; D03D 1/0041; D03D 15/02; A45F 3/14; A45F 2003/142; A45C 13/30
USPC ................ 16/114.1, 405; 150/107, 108, 110; 190/26, 27
See application file for complete search history.

(56) References Cited

U.S. PATENT DOCUMENTS 946,656 A    1/1910  Cole
2,064,781 A  12/1936 Collins
(Continued)

FOREIGN PATENT DOCUMENTS

CN    103373578 A    10/2013
EP    0432535 A1 *   6/1991  ............. A62B 35/04
(Continued)

OTHER PUBLICATIONS

Hu, J., 3-D Fibrous Assemblies, pp. 113-115, 2008 (Year: 2008).*
European Search Report issued in EP Application No. 13002004.3, dated Jul. 9, 2013, 5 pages.

*Primary Examiner* — Cheryl Juska
(74) *Attorney, Agent, or Firm* — Faegre Baker Daniels LLP

(57) ABSTRACT

A flexible reinforced strap for use with baggage as a level of security against theft includes a plurality of warp threads, one or more flexible reinforcing members, and a weft thread. The flexible reinforced strap is of a multi-layered construction, including an intermediate layer situated between a top and a bottom layer. The plurality of warp threads and the one or more flexible reinforcing members are arranged within the plurality of layers, and a weft thread is interwoven to form the flexible reinforced strap.

20 Claims, 5 Drawing Sheets

(51) Int. Cl.
*B32B 5/26* (2006.01)
*A45C 13/30* (2006.01)
*A45C 13/20* (2006.01)
*B32B 5/06* (2006.01)
*B32B 5/04* (2006.01)
*B32B 5/08* (2006.01)
*B32B 5/10* (2006.01)
*D03D 1/00* (2006.01)
*D03D 15/02* (2006.01)

(52) U.S. Cl.
CPC ....... *B32B 2262/14* (2013.01); *B32B 2307/51* (2013.01); *B32B 2307/536* (2013.01); *B32B 2307/554* (2013.01); *B32B 2307/581* (2013.01); *B32B 2307/584* (2013.01); *B32B 2307/732* (2013.01); *B32B 2439/00* (2013.01); *B32B 2439/46* (2013.01)

(56) References Cited

U.S. PATENT DOCUMENTS

| | | | |
|---|---|---|---|
| 2,194,038 A | 3/1940 | Wallace, Jr. | |
| 2,245,095 A | 6/1941 | Nordseth | |
| 2,279,206 A | 4/1942 | Randall | |
| 2,659,958 A | 11/1953 | Johnson | |
| 2,941,914 A | 6/1960 | Ouimet | |
| 3,013,919 A | 12/1961 | Bialy | |
| RE26,704 E | 11/1969 | Norton | |
| 3,875,771 A | 4/1975 | Reisner | |
| 3,908,571 A | 9/1975 | Motsenbocker | |
| 4,018,960 A | 4/1977 | Berger et al. | |
| 4,148,957 A | 4/1979 | Berger et al. | |
| 4,174,738 A | 11/1979 | Berger et al. | |
| 4,209,044 A | 6/1980 | Taki | |
| 4,233,713 A | 11/1980 | Berg | |
| 4,261,493 A * | 4/1981 | Newman | A63C 11/025 224/257 |
| 4,600,626 A | 7/1986 | Ogata | |
| 4,640,179 A | 2/1987 | Cameron | |
| 4,856,837 A | 8/1989 | Hammersla et al. | |
| 5,018,652 A | 5/1991 | Holtzclaw et al. | |
| 5,181,638 A | 1/1993 | McHale | |
| 5,183,703 A | 2/1993 | Berger et al. | |
| 5,219,636 A | 6/1993 | Golz | |
| 5,343,897 A | 9/1994 | Sakatani et al. | |
| 5,415,449 A | 5/1995 | Kentner et al. | |
| 5,419,951 A | 5/1995 | Golz | |
| 5,436,044 A | 7/1995 | Pinkos | |
| 5,498,047 A | 3/1996 | Treuling | |
| 5,655,358 A | 8/1997 | Kolmes | |
| 5,660,312 A | 8/1997 | Suzuki | |
| 5,730,347 A | 3/1998 | Finot | |
| 5,860,769 A | 1/1999 | Seligman | |
| 6,026,662 A | 2/2000 | Schlipper | |
| 6,199,412 B1 | 3/2001 | Kennedy | |
| 6,244,081 B1 | 6/2001 | Schlipper | |
| 6,283,167 B1 * | 9/2001 | Chang | D03D 11/00 139/383 R |
| 6,510,717 B1 | 1/2003 | Levi | |
| 6,626,335 B1 | 9/2003 | Dunlop | |
| 6,802,442 B1 | 10/2004 | Thompson | |
| 7,454,932 B2 | 11/2008 | Hollier | |
| 7,721,518 B2 * | 5/2010 | Danzey | B66C 1/18 57/210 |
| 7,926,859 B2 | 4/2011 | St. Germain | |
| 8,079,387 B2 | 12/2011 | Goering et al. | |
| 8,127,802 B2 | 3/2012 | Ouellette et al. | |
| 8,136,555 B1 * | 3/2012 | Chang | D03D 1/0005 139/383 R |
| 8,267,290 B2 | 9/2012 | Schlipper | |
| 8,789,734 B2 * | 7/2014 | Cross | A45C 3/001 2/248 |
| 9,260,804 B2 * | 2/2016 | He | D03D 3/02 |
| 2002/0129628 A1 | 9/2002 | Skalberg | |
| 2003/0010801 A1 | 1/2003 | Schlipper | |
| 2003/0110818 A1 | 6/2003 | Schlipper | |
| 2005/0005343 A1 | 1/2005 | Johnson | |
| 2005/0278901 A1 | 12/2005 | Huang | |
| 2006/0032883 A1 | 2/2006 | Moreno et al. | |
| 2007/0240798 A1 | 10/2007 | Bihler | |
| 2007/0251279 A1 | 11/2007 | Hollier | |
| 2008/0156835 A1 | 7/2008 | Schlipper | |
| 2008/0182471 A1 * | 7/2008 | Danzey | B66C 1/18 442/199 |
| 2009/0140020 A1 | 6/2009 | Schlipper | |
| 2010/0243114 A1 | 9/2010 | Hai et al. | |
| 2011/0059325 A1 | 3/2011 | Juan et al. | |
| 2011/0088987 A1 | 4/2011 | Santy et al. | |
| 2012/0138403 A1 | 6/2012 | Tong | |
| 2013/0276941 A1 * | 10/2013 | Schlipper | A45F 3/14 150/107 |
| 2014/0113519 A1 * | 4/2014 | Golz | D02G 3/442 442/190 |
| 2015/0013079 A1 * | 1/2015 | Golz | D03D 15/0033 8/638 |
| 2018/0016712 A1 * | 1/2018 | Terai | D03D 1/0005 |

FOREIGN PATENT DOCUMENTS

| | | | |
|---|---|---|---|
| EP | 1688059 B1 | 8/2006 | |
| EP | 1941812 A1 | 7/2008 | |
| EP | 2064967 A2 | 6/2009 | |
| EP | 2653056 A2 | 10/2013 | |
| FR | 2168262 A1 * | 8/1973 | .............. D03D 3/00 |
| JP | 04027640 A * | 1/1992 | |
| WF | 2005118990 A1 | 12/2005 | |

* cited by examiner

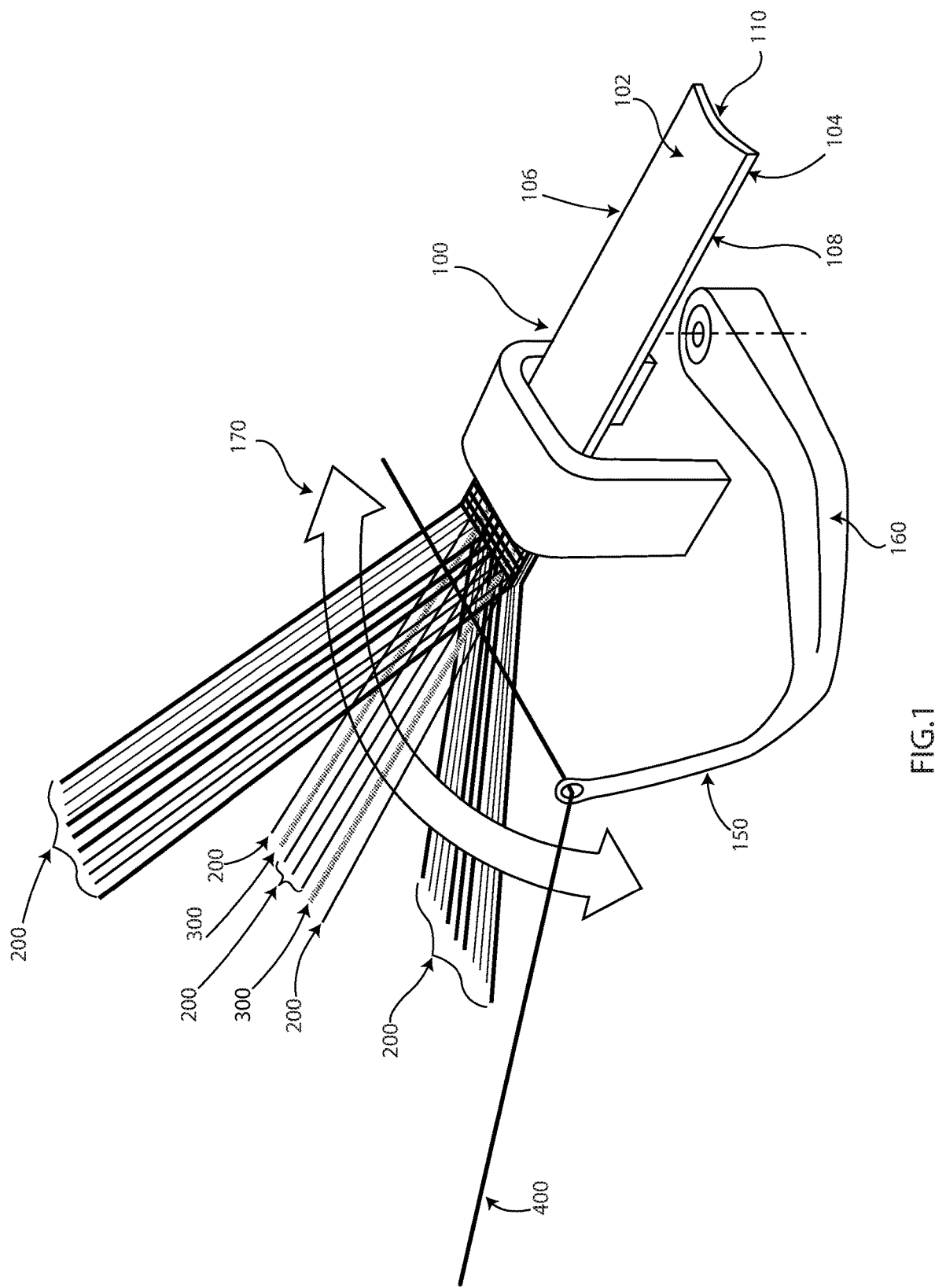

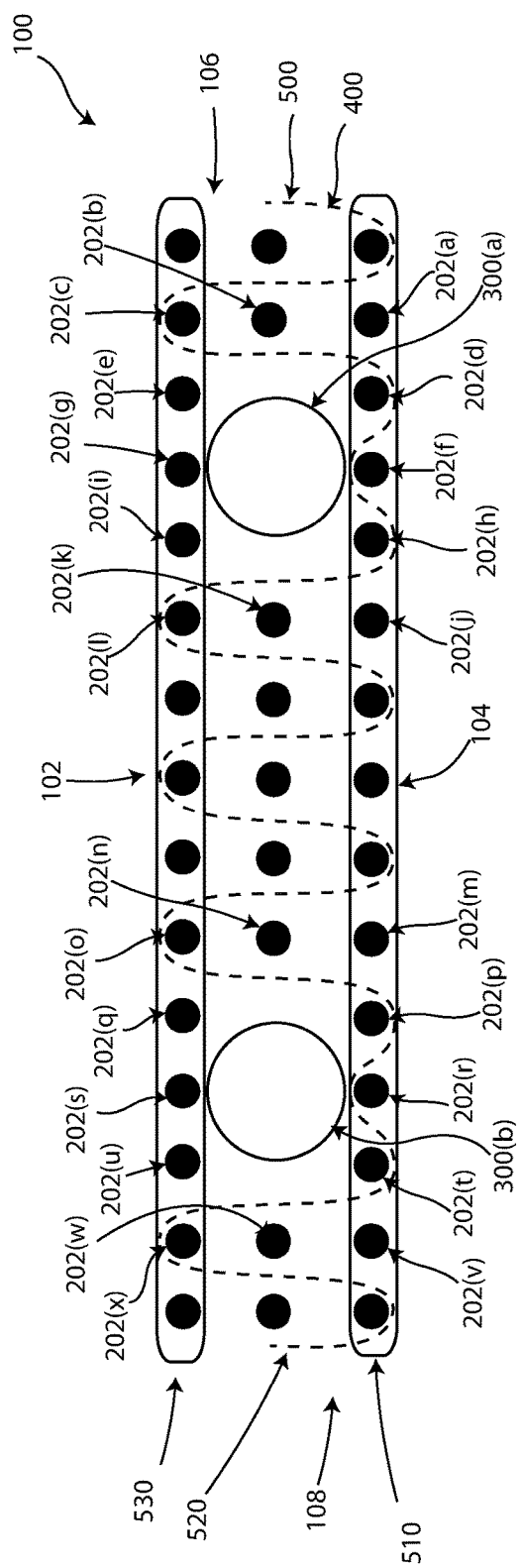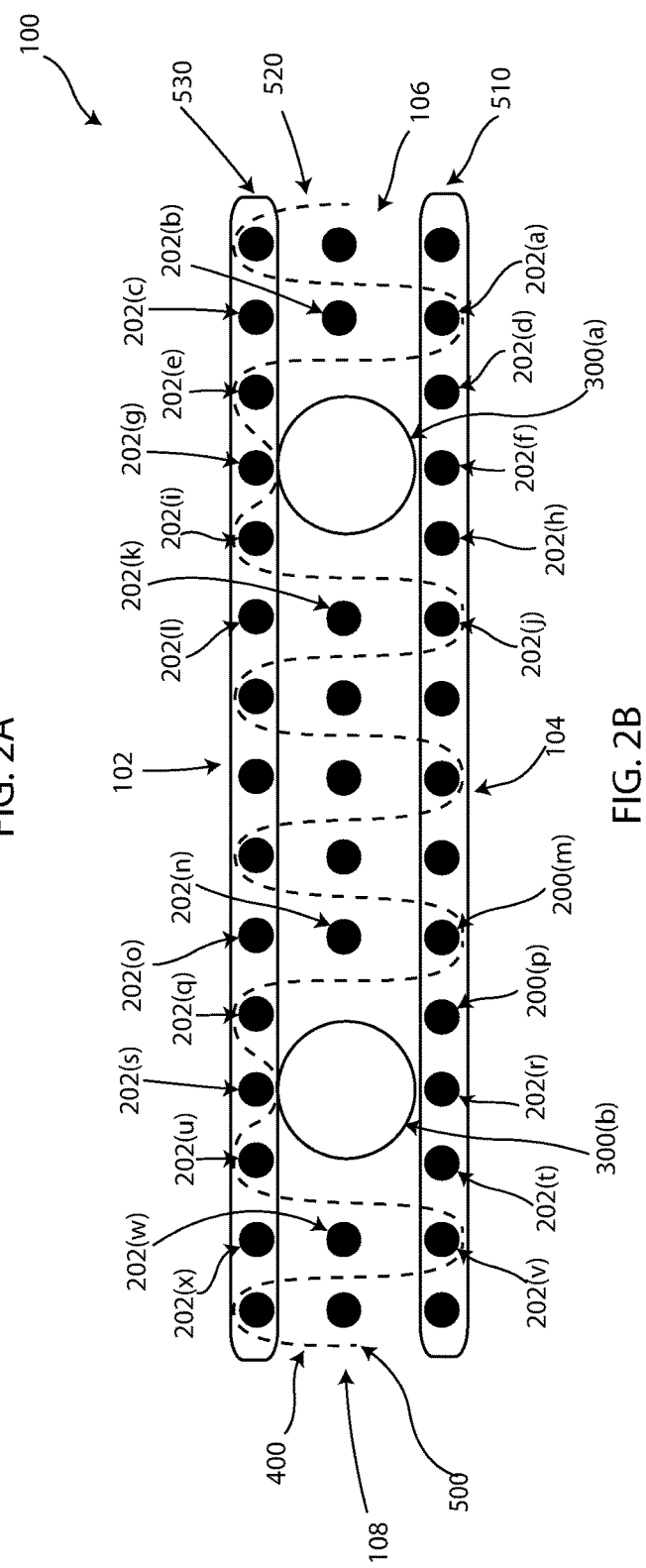

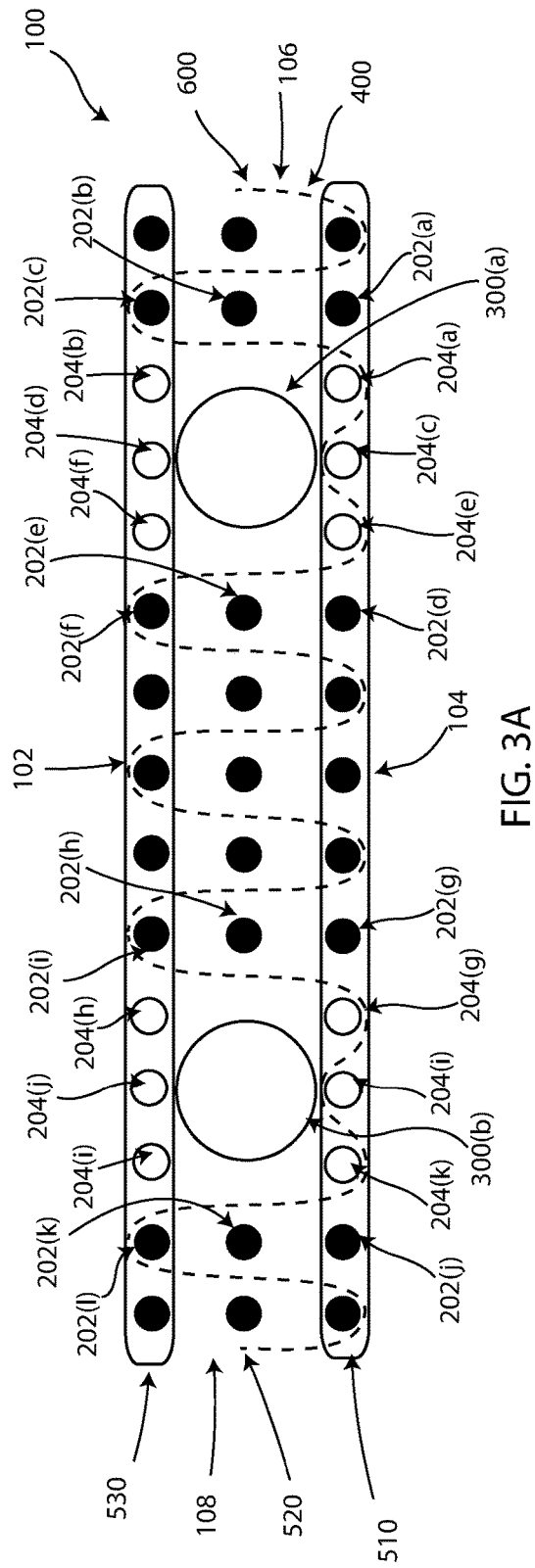
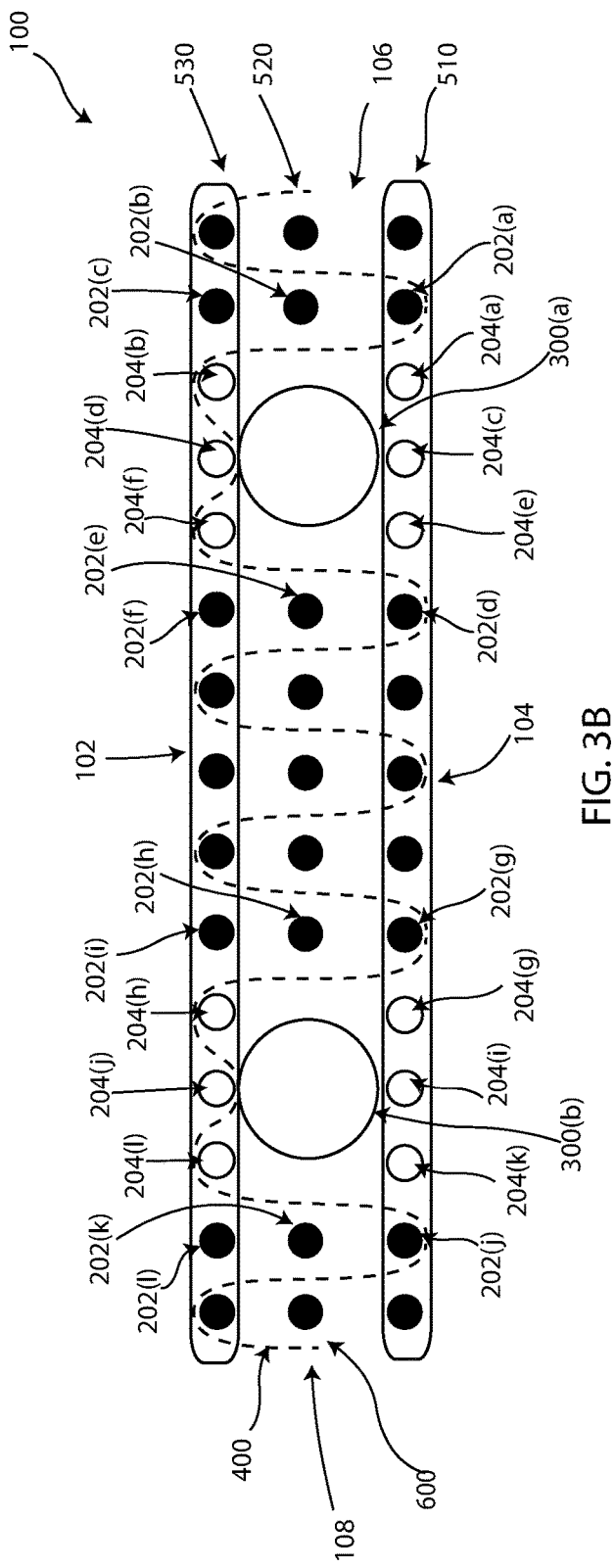
FIG. 3A
FIG. 3B

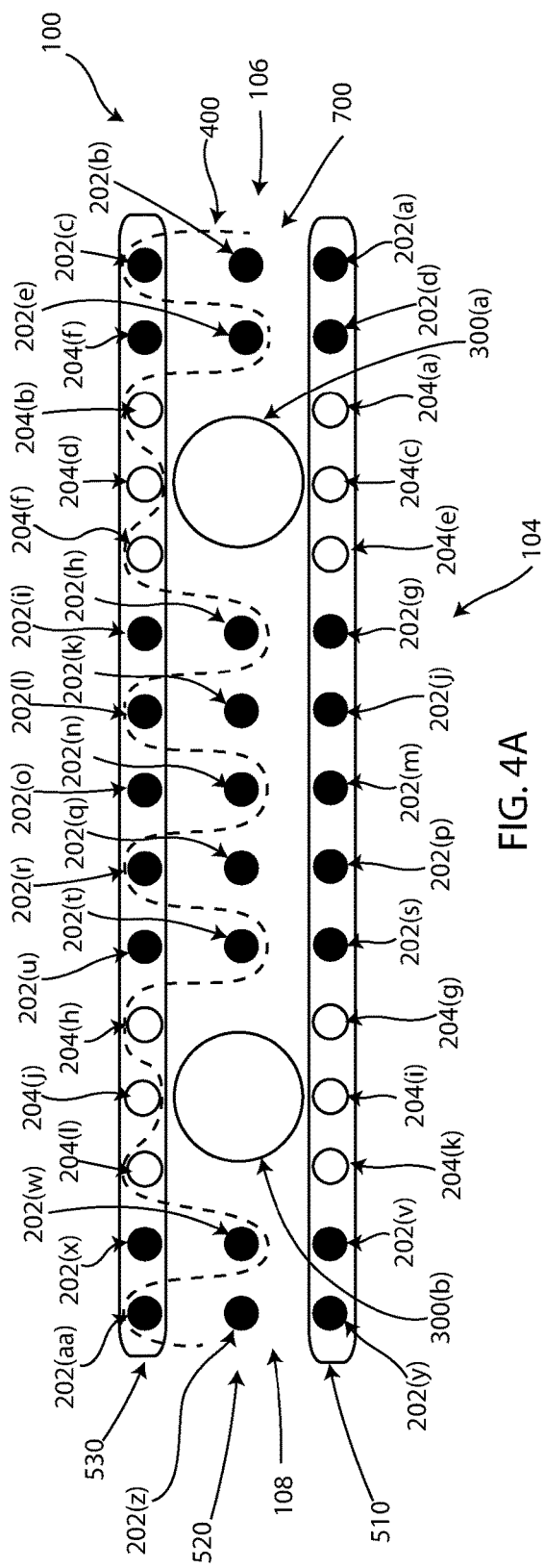
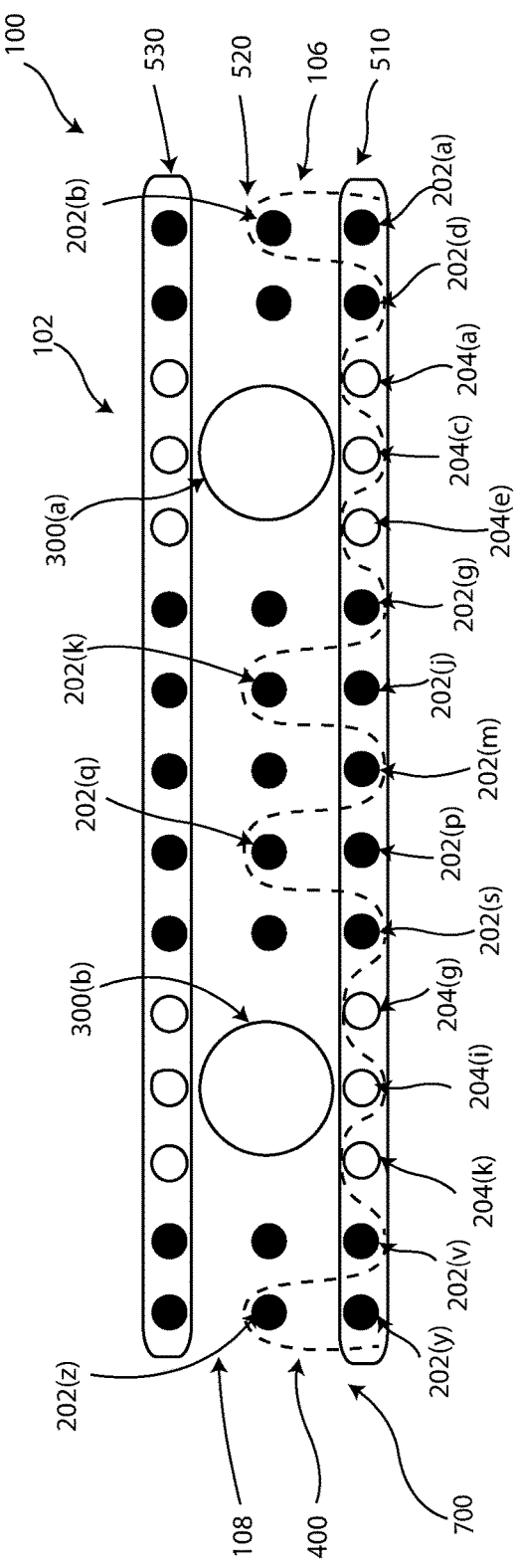
FIG. 4A
FIG. 4B

REINFORCED TEXTILE STRAP

CROSS REFERENCE TO RELATED APPLICATIONS

This application claims the benefit under Title 35, U.S.C. § 119 of U.S. Provisional Patent Application No. 62/237,308, entitled REINFORCED TEXTILE STRAP, filed Oct. 5, 2015, the entire disclosure of which is expressly incorporated by reference herein.

TECHNICAL FIELD

Embodiments of the present invention relate generally to reinforced textile straps for use with baggage as a level of security against theft.

BACKGROUND

The use of wire cable, or like reinforcements, in the construction of flexible carrying straps for baggage provides an increased level of security against theft, particularly that achieved by slicing the strap.

Previous wire reinforcement strap constructions have proven to be complex constructions, requiring a complicated, multi-staged manufacturing process. It will be understood that although such designs provide for conventional sewing manufacturing techniques, the number of separate parts and manufacturing steps required tends to increase the manufacturing costs in straps of this type.

Additionally, due primarily to the size and shape of the strap after having the wire reinforcement incorporated therein, these previous wire reinforced strap constructions often require custom hardware (e.g., buckles and the like) for incorporation into the products they seek to protect. Perhaps more alarming, it is common for the wire cable reinforcement to abrade the surrounding strap material, causing a dissatisfactory reduction in life of the strap.

Improvement of reinforced straps for securing baggage against theft is therefore needed. It is an object of the present disclosure to overcome the above-discussed disadvantages and problems, and more generally to provide a flexible reinforced textile strap.

SUMMARY

Some embodiments relate to a flexible reinforced strap comprising a plurality of layers, the plurality of layers including: a first side layer including a plurality of first warp threads, a second side layer including a plurality of second warp threads, and at least one intermediate layer situated between the first side layer and the second side layer, the at least one intermediate layer including a flexible reinforcing member and a plurality of third warp threads, and a weft thread, the weft thread being interwoven with one or more of the warp threads of each of the plurality of layer such that the flexible reinforcing member is retained between the first side layer and the second side layer, and such that the flexible reinforcing member is retained between two or more of the plurality of third warp threads.

In some embodiments, the flexible reinforced strap further including a plurality of longitudinal edges, an upper face, and a lower face, wherein the weft thread is interwoven such that a first one of the plurality of third warp threads is situated between a first one of the plurality of longitudinal edges and the flexible reinforcing member and such that at second one on the plurality of third warp threads is situated between a second one of the plurality of longitudinal edges and the flexible reinforcing member.

In some embodiments, at least one intermediate layer of the flexible reinforced strap includes a plurality of flexible reinforcing members.

In some embodiments, the plurality of layers of the flexible reinforced strap includes a plurality of intermediate layers, and at least one of the plurality of intermediate layers includes the flexible reinforcing member.

In some embodiments, the plurality of first warp threads and the plurality of second warp threads of the flexible reinforced strap are made of a synthetic material.

In some embodiments, the first side layer of the flexible reinforced strap includes a plurality of fourth warp threads made of a high-modulus material having an abrasion resistance in excess of an abrasion resistance of the first warp threads.

In some embodiments, the second side layer of the flexible reinforced strap includes a plurality of fifth warp threads made of a high-modulus material having in excess of an abrasion resistance of the second warp threads.

In some embodiments, the weft thread of the flexible reinforced strap is interwoven such that the flexible reinforcing member is situated between one or more of the fourth warp threads of the first side layer and one or more of the fifth warp threads of the second side layer.

In some embodiments, the flexible reinforcing member of the flexible reinforced strap is concealed.

In some embodiments, the flexible reinforcing member of the flexible reinforced strap is a multi-stranded wire cable.

In some embodiments, the multi-stranded wire cable of the flexible reinforced strap is twisted.

In some embodiments, the multi-stranded wire cable of the flexible reinforced strap is coated in plastic.

In some embodiments, the weft thread of the flexible reinforced strap is interwoven with the plurality of warp threads such that the flexible reinforced strap has a thickness and a width greater than the thickness.

In some embodiments, the weft thread of the flexible reinforced strap is a single continuous weft thread.

Some embodiments relate to a flexible strap comprising: a first plurality of warp threads and a second plurality of warp threads, a flexible reinforcing member, and a single weft thread interwoven with one or more warp threads of the first plurality of warp threads and one or more warp threads of the second plurality of warp threads such that the flexible reinforcing member is situated between at least one warp thread of the first plurality of warp threads and at least one warp thread of the second plurality of warp threads, and such that at least one warp thread is situated between a first longitudinal edge of the flexible strap, and such that at least one warp thread is situated between a second longitudinal edge of the flexible strap.

In some embodiments, one or more of the warp threads of the first plurality of warp threads of the flexible strap are high-modulus synthetic threads having an abrasion resistance that exceeds and abrasion resistance of each of the warp threads of the second plurality of warp threads.

In some embodiments, the weft thread of the flexible strap is a single continuous weft thread.

In some embodiments, the first flexible reinforcing member of the third layer of the flexible strap is a multi-stranded wire cable.

In some embodiments, the multi-stranded wire cable of the flexible strap is a twisted wire cable made of stainless steel.

In some embodiments, the multi-stranded wire cable of the flexible strap is coated with plastic.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 illustrates a front perspective view of a length of a flexible reinforced strap with an exposed cross-section according to embodiments of the present invention.

FIGS. 2A-2C illustrate a cross-section of a flexible reinforced strap, according to embodiments of the present invention.

FIG. 3A-3B illustrate a cross-section of a flexible reinforced strap, according to embodiments of the present invention.

FIG. 4A-4B illustrate a cross-section of a flexible reinforced strap, according to embodiments of the present invention.

Figure 2C:
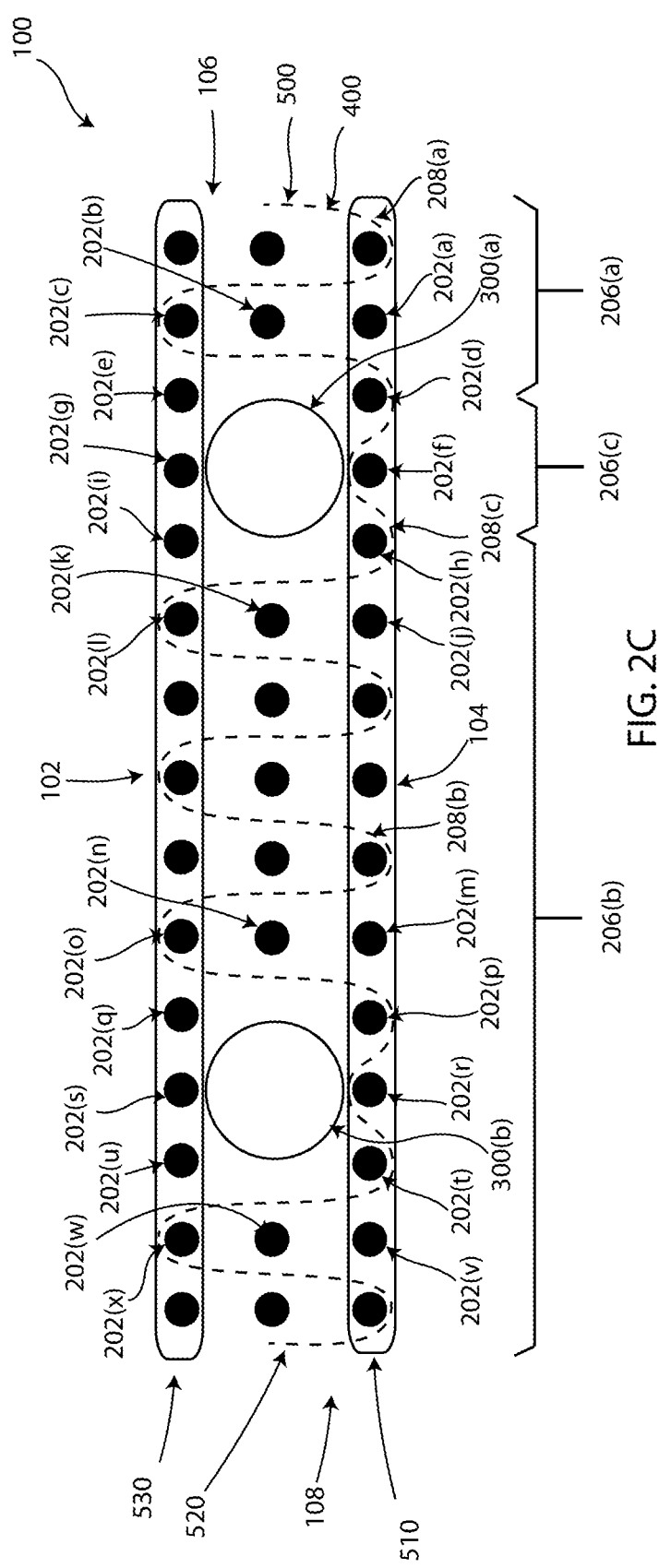

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention relate generally to reinforced textile straps, such as flexible reinforced straps for use with baggage as a level of security against theft. Referring to the drawings, FIG. 1 illustrates a flexible reinforced strap 100 according to one embodiment. The flexible reinforced strap 100 of FIG. 1 generally includes a plurality of sides (such sides 102 and 104), a plurality of opposing longitudinal edges (such as edges 106 and 108), a first end 110 and a second end (not shown). In certain embodiments, the flexible reinforced strap 100 comprises a plurality of warp threads 200 and one or more flexible reinforcing members 300. As discussed in greater detail below, the warp threads 200 and the flexible reinforcing member 300 are interwoven via a weft thread 400 to form the flexible reinforced strap 100.

In one embodiment, the flexible reinforced strap 100 includes a plurality of warp threads 200, each warp thread of the plurality of warp threads 200 being the same material. In some embodiments, the warp threads are made of natural or synthetic thread. In one embodiment, the synthetic threads may include heat fusible synthetic threads. Additionally, in one embodiment, the synthetic threads may include high-modulus synthetic threads that are resistant to abrasion. In various embodiments, the plurality of warp threads 200 includes one or more warp threads made of a different material relative to one or more other warp threads of the plurality of warp threads 200. For example, in one embodiment, the plurality of warp threads 200 includes a first warp thread made of a first material (such as a first synthetic thread) and a second warp thread made of a second material (such as a second, different synthetic thread). In one such embodiment, the second synthetic thread is more resistant to abrasion than the first synthetic thread. It should be appreciated that the plurality of warp threads 200 may encompass any number of differing synthetic threads.

In various embodiments, the flexible reinforcing member 300 serves to reinforce the strap against cutting (e.g., being cut by a blade). In one embodiment, the flexible reinforcing member 300 is a wire cable (e.g., a multi-stranded twisted wire cable). Alternatively, in other embodiments, other reinforcing members may be utilized. For example, in one alternative embodiment, composite multifilament threads, such as para-aramid fibers or carbon nanotubes, may be utilized in the construction of the flexible reinforcing member 300. In various embodiments, the flexible reinforcing member 300 is sheathed or coated with plastic, or with a similar material. In some embodiments, such a sheathing or coating provides for protection of the flexible reinforcing member. Additionally, in certain embodiments, such a sheathing or coating provides for a reduction in the potential for abrasion of the warp and weft thread surrounding the flexible reinforcing member 300.

In one embodiment, the flexible reinforced strap 100 is generally oblong, having a width substantially greater than its thickness (as illustrated in FIGS. 1-3). Additionally, the flexible reinforced strap 100 has a generally constant thickness throughout its length. In various embodiments, the flexible reinforced strap 100 comprises a multi-layer construction, including at least one intermediate layer 520 disposed between a bottom later 510 and a top layer 530. In various embodiments, the flexible reinforcing member 300 is similarly disposed between the bottom layer 510 and the top layer 530.

In various embodiments, each layer of the multi-layer construction includes a plurality of warp threads 200, represented in FIGS. 2A-3B by three parallel, linear arrays of circles. As discussed above, in certain embodiments, each warp thread in each layer of the multi-layered construction is made of the same material. For example, referring now to FIGS. 2A and 2B, a plurality of warp threads 202 are included in each of the plurality of layers 510, 520, and 530. As illustrated in FIGS. 2A and 2B, the bottom layer includes warp threads 202 (e.g., warp threads 202(a), 202(d), 202(f), 202(h), 202(j), 202(m), 202(p), 202(r), 202(t), and 202(v)), the intermediate layer includes warp threads 202 (e.g., warp threads 202(b), 202(k), 202(n), and 202(w)), and the top layer includes warp threads 202 (e.g., warp threads 202(c), 202(e), 202(g), 202(i), 202(l), 202(o), 202(q), 202(s), 202(u), and 202(x)). Additionally, as illustrated, a plurality of flexible reinforcing members 300 (e.g., flexible reinforcing members 300(a) and 300(b)) are disposed between the bottom layer 510 and the top layer 530.

In various embodiments, the flexible reinforced strap 100 is constructed such that the flexible reinforcing member 300 is surrounded by warp threads 202. For example, as illustrated in FIGS. 2A and 2B, flexible reinforcing member 300(a) is disposed between the bottom layer 510 and the top layer 530 such that it is surrounded by a plurality of warp threads 202 (e.g., warp thread 202(a)-202(l)). Similarly, as illustrated, flexible reinforcing member 300(b) is disposed between the bottom layer 510 and the top layer 530 such that it is surrounded by a plurality of warp threads 202 (e.g., warp threads 202(m)-202(x)).

In one embodiment, a single, continuous weft thread (represented in FIGS. 2A and 2B by dashed line 400) operates to interweave the plurality of warp threads 200 and flexible reinforcing members 300 of the plurality of layers of the flexible reinforced strap 100. In various embodiments, weft thread 400 is drawn along a path 500 through or about the plurality of warp threads 200 of the multiple layers of the flexible reinforced strap 100 to form the flexible reinforced strap 100.

Referring specifically to the illustrated embodiment of FIG. 2A, a first pass of the weft thread 400 from the first longitudinal edge 106 to the second longitudinal edge 108 is illustrated. Between the first longitudinal edge 106 and a first one of the flexible reinforcing members 300(*a*), the weft thread 400 travels through the warp threads 200 of the bottom, intermediate, and top layers one or more times such that one or more warp threads 200 from each of the plurality of layers are captured by the weft thread 400 and are situated between a first longitudinal edge 106 and the flexible reinforcing member 300(*a*).

During this first pass, while still situated between the first longitudinal edge 106 and the first flexible reinforcing member 300(*a*), the weft thread 400 returns to the bottom layer 510. The weft thread 400 then travels across a plurality of the warp threads 200 of the bottom layer 510 before exiting the bottom layer 510 and traveling through the intermediate layer 520 to the top layer 530. For example, as illustrated in FIG. 2A, upon returning to the bottom layer 510, the weft thread 400 passes below warp thread 202(*d*), above warp thread 202(*f*), and below warp thread 202(*h*) before exiting the bottom layer 510 and traveling through the intermediate layer 520 to the top layer 530. Such a configuration provides that one or more warp threads 200 of the bottom layer 510 are interwoven and situated between the flexible reinforcing member 300(*a*) and the bottom side 104.

In the illustrated embodiment of FIG. 2A, during this first pass, after exiting the bottom layer 510, and while situated between the plurality of flexible reinforcing members 300(*a*) and 300(*b*), the weft thread 400 travels through the intermediate layer 520 to the top layer 530, and thereafter transitions between the top and bottom layer at least once (passing through the intermediate layer 520 during each transition). While still situated between the plurality of flexible reinforcing members 300(*a*) and 300(*b*), the weft thread 400 returns to the bottom layer 510. The weft thread 400 then travels through a plurality of the warp threads 200 of the bottom layer 510 before exiting the bottom layer 510 and traveling through the intermediate layer 520 to the top layer 530. For example, as illustrated in FIG. 2A, upon returning to the bottom layer 510, the weft thread 400 passes below warp thread 202(*p*), above warp thread 202(*r*), and below warp thread 202(*t*) before exiting the bottom layer 510 and traveling through the intermediate layer 520 to the top layer 530. Such a configuration provides that one or more warp threads 200 of the bottom layer 510 are interwoven and situated between the flexible reinforcing member 300(*b*) and the bottom side 104.

In the illustrated embodiment of FIG. 2A, during this first pass, after exiting the bottom layer 510 between the flexible reinforcing member 300(*b*) and the second longitudinal edge 108, the weft thread 400 travels through the intermediate layer 520 to the top layer 530, and thereafter transitions between the top and bottom layer at least once (passing through the intermediate layer 520 during each transition). Such a configuration provides that one or more warp threads 200 from each of the plurality of layers are captured by the weft thread 400 and are situated between the second longitudinal edge 108 and the flexible reinforcing member 300(*b*).

Referring now to FIG. 2B, after transitioning between the top and bottom layer at least once while situated between the flexible reinforcing member 300(*a*) and the second longitudinal edge 108, the weft thread 400 makes a second pass from the second longitudinal edge 108 to the first longitudinal edge 106. In one embodiment, the second pass is a return trip of the weft thread 400 from the second longitudinal edge 108 to the first longitudinal edge 106, wherein the path of the weft thread 400 during the second pass is the mirror image of the path of the weft thread 400 during the first pass.

Specifically, in the illustrated embodiment of FIG. 2B, during the second pass, and while being situated between the second longitudinal edge 108 and flexible reinforcing member 300(*b*), the weft thread 400 travels through the warp threads 200 of the bottom, intermediate, and top layers a designated number of times such that it returns to the top layer 530 and is positioned to travel through a plurality of warp threads of the top layer 530 above the flexible reinforcing member 300(*b*) (based on the weft thread passing through a plurality of the warp threads of the bottom layer 510 below the flexible reinforcing member 300(*b*) during the first pass).

The weft thread 400 then travels across a plurality of the warp threads 200 of the top layer 530 before exiting the top layer 530 and traveling through the intermediate layer 520 to the bottom layer 510. For example, as illustrated in FIG. 2B, upon returning to the top layer 530, the weft thread 400 passes above warp thread 202(*u*), below warp thread 202(*s*), and above warp thread 202(*q*) before exiting the top layer 530 and traveling through the intermediate layer 520 to the bottom layer 510. Such a configuration provides that one or more warp threads 200 of the top layer 530 are interwoven and situated between the flexible reinforcing member 300(*b*) and the top side 102. It should be appreciated that such a path is mirror to the path taken by the weft thread 400 in this section of the flexible reinforced strap 100 during the first pass (see FIG. 2A).

In the illustrated embodiment of FIG. 2B, during this second pass, after exiting the top layer 530, and while situated between the plurality of flexible reinforcing members 300(*a*) and 300(*b*), the weft thread 400 travels through the intermediate layer 520 to the bottom layer 510, and thereafter transitions between the top and bottom layer at least once (passing through the intermediate layer 520 during each transition). While still situated between the plurality of flexible reinforcing members 300(*a*) and 300(*b*), the weft thread 400 returns to the top layer 530. The weft thread 400 then travels through a plurality of the warp threads 200 of the top layer 530 above the flexible reinforcing member 300(*a*) before exiting the top layer 530 and traveling through the intermediate layer 520 to the bottom layer 510. For example, as illustrated in FIG. 2B, upon returning to the top layer 530, the weft thread 400 passes above warp thread 202(*i*), below warp thread 202(*g*), and above warp thread 202(*e*) before exiting the top layer 530 and traveling through the intermediate layer 520 to the bottom layer 510. Such a configuration provides that one or more warp threads 200 of the top layer 510 are interwoven and situated between the flexible reinforcing member 300(*a*) and the top side 102. It should also be appreciated that such a path is mirror to the path taken by the weft thread 400 in this section of the flexible reinforced strap 100 during the first pass (see FIG. 2A).

In the illustrated embodiment of FIG. 2B, during this second pass, after exiting the top layer 530 between the flexible reinforcing member 300(*a*) and the first longitudinal edge 106, the weft thread 400 travels through the intermediate layer 520 to the top layer 530, and thereafter transitions between the top and bottom layer at least once (passing through the intermediate layer 520 during each transition). Such a configuration provides that one or more warp threads 200 from each of the plurality of layers are captured by the weft thread 400 and are situated between the first longitudinal edge 106 and the flexible reinforcing member 300(a). It should also be appreciated that such a path is mirror to the path taken by the weft thread 400 in this section of the flexible reinforced strap 100 during the first pass (see FIG. 2A).

In one embodiment, above-discussed weaving procedure is repeated until the desired length of the flexible reinforced strap 100 is achieved. It should be appreciated that during such a repetition, each subsequent pass is mirror to the immediately preceding pass. For example, during repetition, the third pass (which is identical to the first pass) is mirror to the second pass, the fourth pass (which is identical to the second pass) is mirror to the third pass, the fifth pass (which is identical to the first and third passes) is mirror to the forth pass, and so on.

The terms "first pass" and "second pass" as used herein are utilized to reference to the embodiments illustrated herein, and are not meant limit on the orientation or timing of the weft thread through the layers of the flexible reinforced strap during manufacturing. Instead, it should be appreciated that the weft thread may pass above, or alternatively below, the flexible reinforcing members during a first pass of the weft thread from a first longitudinal edge to an opposing longitudinal edge. Moreover, while the above- and below-discussed example embodiments each illustrate the weft thread 400 passing on the same side of the flexible reinforcing member (during a given pass of the weft thread), it should be appreciated that, for a given pass of the weft thread 400, the weft thread may pass opposing sides of the flexible reinforcing members. For example, if the weft thread 400 passes above the first flexible reinforcing member 300(a) on a given pass, then the weft thread 400 passes below the second flexible reinforcing member 300(b) on that same pass.

By passing the weft thread 400 through the plurality of layers of warp thread 200 as disclosed herein, the flexible reinforcing member 300 can be woven into the flexible reinforced strap during manufacture without requiring any additional post construction stitching or weaving. Moreover, by passing the weft thread 400 through the plurality of layers of warp thread 200 in the manner disclosed herein, the warp threads 200 operate together with the weft thread 400 to envelop or conceal the flexible reinforcing member 300 within the flexible reinforced strap and prevent its lateral movement therein. Finally, where multiple flexible reinforcing members 300 are incorporated, by passing the weft thread 400 through the plurality of layers of warp thread 200 in the manner disclosed herein, the warp threads 200 operate together with the weft thread 400 to envelop the flexible reinforcing members 300 within the flexible reinforced strap and maintain their separation. These features assist in helping the flexible strap maintain a generally consistent lateral cross-section during use, and avoid the potential for one flexible reinforcing member 300 to overly the other in a manner that may cause discomfort and localized wear.

FIG. 2C further illustrates the flexible reinforced strap 100 illustrated in FIGS. 2A and 2B. With reference to FIG. 2C, the flexible reinforced strap 100 may alternatively be described as including a first longitudinal edge 106, a second longitudinal edge 108, a first side layer 530 including a plurality of first warp threads (e.g., warp threads 202(c), 202(e), 202(g), 202(i), 202(l), 202(o), 202(q), 202(s), 202(u), and 202(x)), a second side layer 510 including a plurality of second warp threads (e.g., warp threads 202(a), 202(d), 202(f), 202(h), 202(j), 202(m), 202(p), 202(r), 202(t), and 202(v)), and at least one intermediate layer 520 situated between the first side layer 530 and the second side layer 510. The at least one intermediate layer 520 includes a flexible reinforcing member 300(a) extending in a warp direction and a plurality of third warp threads (e.g., warp threads 202(b), 202(n), 202(w), and 202(k)). A weft thread 400 is interwoven with one or more of the warp threads of each of the plurality of layers 510, 520, 530 to form the flexible reinforced strap 100. In a first region 206(a) defined between the first longitudinal edge 106 and the flexible reinforcing member 300(a) the weft thread 400 follows a first path 208(a) that traverses between the first and second layers 530, 510 by extending through a first portion of the intermediate layer 520. In a second region 206(b) defined between the second longitudinal edge 108 and the flexible reinforcing member 300(a) the weft thread 400 follows a second path 208(b) that traverses between the first and second layers 530, 510 by extending through a second portion of the intermediate layer 520. In a third region 206(c) defined between the first and second regions 206(a), 206(b) the weft thread 400 follows a third path 208(c) different from the first and second paths 208(a), 208(b) that includes the weft thread 400 being interwoven with multiple consecutive warp threads of one of the first and second side layers 530, 510, such that the flexible reinforcing member 300(a) is retained between the first side layer 530 and the second side layer 510, and such that the flexible reinforcing member 300(a) is retained between two or more of the plurality of third warp threads.

While the flexible reinforced strap 100 of the above-discussed embodiments includes a multi-layered construction comprising a plurality of warp threads made of the same material, in various alternative embodiments, one or more layers of the multi-layered construction include one or more warp threads made of a different material. For example, referring now to FIGS. 3A and 3B, flexible reinforced strap 100 includes warp threads 202 and 204. In one embodiment, warp thread 204 is a warp thread having a different material property (such as an increased abrasion resistance) relative to the warp thread 202, as discussed herein. Thus, in this illustrated example alternative embodiment, the flexible reinforced strap 100 includes a first warp thread 202 made of a first material having a first abrasion resistance, and a second warp thread 204 made of a second material having a second, different abrasion resistance. It should be appreciated that such abrasion-resistant threads operate to extend the life of the strap by reducing the abrasive effects of the flexible reinforcing member 300. It should also be appreciated that other material properties (e.g., modulus of elasticity, hardness, etc) may exist between the first and second warp threads.

As illustrated in the alternative example embodiments of FIGS. 3A and 3B, the bottom layer 510 includes warp threads 202 (such as warp threads 202(a), 202(d), 202(g), and 202(j)) and warp threads 204 (e.g., warp threads 204(a), 204(c), 204(e), 204(g), 204(i), and 204(k)). The intermediate layer 520 includes warp threads 202 (e.g., warp threads 202(b), 202(e), 202(h), and 202(k)). The top layer 530 includes warp threads 202 (e.g., warp threads 202(c), 202(f), 202(i), and 202(l)) and warp threads 204 (e.g., warp threads 204(b), 204(d), 204(f), 204(h), 204(j), and 204(l)). Additionally, like the embodiments discussed with regard to FIGS. 2A and 2B, a plurality of flexible reinforcing members 300 (e.g., flexible reinforcing members 300(a) and 300(b)) are disposed between the bottom layer 510 and the top layer 530 in these alternative embodiments.

Additionally, in one alternative embodiment, the flexible reinforced strap 100 is constructed such that the flexible reinforcing member 300 is surrounded by warp threads (e.g., 202 and/or 204). For example, as illustrated in FIGS. 3A and 3B, flexible reinforcing member 300(a) is disposed between the bottom layer 510 and the top layer 530 such that it is surrounded by a plurality of warp threads 202 (e.g., warp threads 202(a)-202(f)) and 204 (e.g., warp threads 204(a)-204(f)). Similarly, as illustrated, flexible reinforcing member 300(b) is disposed between the bottom layer 510 and the top layer 530 such that it is surrounded by a plurality of warp threads 202 (e.g., warp threads 202(g)-202(l)) and 204 (e.g., warp threads 204(g)-204(l)). It should be appreciated that such a construction provides or a flexible reinforced strap 100 that serves to be resistant to cutting, while maintaining flexibility and resistance to abrasion.

Like the above-discussed embodiments regarding FIGS. 2A and 2B, in these alternative embodiments, a single, continuous weft thread (represented in FIGS. 3A and 3B by dashed line 400) operates to interweave the plurality of warp threads 200 and flexible reinforcing members 300 of the plurality of layers of the flexible reinforced strap 100. In one such alternative embodiment, weft thread 400 is drawn along a path 600 which extends through or about the plurality of warp threads 200 of the multiple layers of the flexible reinforced strap 100 to form the flexible reinforced strap 100. While path 600 generally accords with path 500 (FIGS. 2A and 2B) in that the path 600 does not deviate from path 500, the threads with which warp thread 400 interacts differs in these alternative embodiments. For example, in these alternative embodiments, warp threads 202(d), 202(f), and 202(h) (FIG. 2A) have been replaced by warp threads 204(a), 204(c), and 204(e) (FIG. 3A).

Thus, as illustrated in FIG. 3A, in these alternative embodiments, during this first pass, while still situated between the first longitudinal edge 106 and the first flexible reinforcing member 300(a), upon returning to the bottom layer 510, the weft thread 400 passes below warp thread 204(a), above warp thread 204(c), and below warp thread 204(e) before exiting the bottom layer 510 and traveling through the intermediate layer 520 to the top layer 530. Such a configuration provides that one or more abrasion-resistant warp threads are interwoven and situated between the flexible reinforcing member 300(a) and the bottom side 104.

Similarly, in these alternative embodiments, warp threads 202(d), 202(f), and 202(h) (FIG. 2A) have been replaced by warp threads 204(a), 204(c), and 204(e) (FIG. 3A). Thus, as illustrated in FIG. 3A, during the first pass, while still situated between the plurality of flexible reinforcing members 300(a) and 300(b), upon returning to the bottom layer 510, the weft thread 400 passes below warp thread 204(g), above warp thread 204(i), and below warp thread 204(k) before exiting the bottom layer 510 and traveling through the intermediate layer 520 to the top layer 530. Such a configuration provides that one or more abrasion-resistant warp threads are interwoven and situated between the flexible reinforcing member 300(b) and the bottom side 104.

Similar differences exist with regard to the second pass in these alternative embodiments. For example, in these alternative embodiments, warp threads 202(u), 202(s), and 202(g) (FIG. 2B) have been replaced by warp threads 204(l), 204(j), and 204(h) (FIG. 3B). Thus, in these alternative embodiments, during the second pass, while still situated between the second longitudinal edge 108 and the second flexible reinforcing member 300(b), upon returning to the top layer 530, the weft thread 400 passes above warp thread 204(l), below warp thread 204(j), and above warp thread 204(h) before exiting the top layer 530 and traveling through the intermediate layer 520 to the bottom layer 510. Such a configuration provides that one or more abrasion-resistant warp threads are interwoven and situated between the flexible reinforcing member 300(b) and the top side 102.

Similarly, in these alternative embodiments, warp threads 202(i), 202(g), and 202(e) (see FIG. 2B) have been replaced by warp threads 204(f), 204(d), and 204(b) (see FIG. 3B). Thus, during this second pass, while still situated between the plurality of flexible reinforcing members 300(a) and 300(b), upon returning to the top layer 530, the weft thread 400 passes above warp thread 204(f), below warp thread 204(d), and above warp thread 204(b) before exiting the top layer 530 and traveling through the intermediate layer 520 to the bottom layer 510. Such a configuration provides that one or more abrasion-resistant warp threads are interwoven and situated between the flexible reinforcing member 300(a) and the top side 102.

In one alternative embodiment, the weft thread additionally interweaves one of more of the plurality of warp threads in the intermediate layer with one or more of the warp threads in the top and/or bottom layer. For example, referring to the illustrated embodiments of FIGS. 4A and 4B, a first pass of the weft thread 400 from the first longitudinal edge 106 to the second longitudinal edge 108 is illustrated.

On the first pass, while the weft thread is between the first longitudinal edge 106 and a first one of the flexible reinforcing members 300(a), the weft thread 400 travels through the warp threads 200 of the intermediate and top layers one or more times such that one or more warp threads 200 from each of the intermediate and top layer are captured by the weft thread 400 and are situated between a first longitudinal edge 106 and the flexible reinforcing member 300(a). For example, as illustrated in FIG. 4A, after passing above warp thread 202(c) and before passing above warp thread 202(h), weft thread exits the top layer 530 and passes below warp thread 202(e) of the intermediate layer 520.

During this first pass, while still situated between the first longitudinal edge 106 and the first flexible reinforcing member 300(a), the weft thread 400 travels across a plurality of the warp threads 200 of the top layer 530 before exiting the top layer 530 and again interweaving one or more warp threads of the intermediate layer 520. For example, as illustrated in FIG. 4A, upon returning to the top layer 530, the weft thread 400 passes above warp thread 202(h), then below warp thread 202(j), and above warp thread 202(l) before exiting the top layer 530 and returning to the intermediate layer 520. Such a configuration provides that one or more warp threads 200 of the top layer 530 are interwoven and situated between the flexible reinforcing member 300(a) and the top side 102.

In the illustrated embodiment of FIG. 4A, during this first pass, after exiting the top layer 510, and while situated between the plurality of flexible reinforcing members 300(a) and 300(b), the weft thread 400 returns to the intermediate layer 520 and interweaves one or more warp threads 202 of the intermediate layer with one or more warp threads 202 of the top layer 530. In one embodiment, after returning to the intermediate layer 520 while situated between the plurality of flexible reinforcing members 300(a) and 300(b), weft thread 400 transitions between warp threads 200 of the top and intermediate layers at least once. Thereafter, and while still situated between the plurality of flexible reinforcing members 300(a) and 300(b), the weft thread 400 returns to the top layer 530. The weft thread 400 then travels through a plurality of the warp threads 200 of the top layer 530 before exiting the top layer 530 and returning to the intermediate layer 520. For example, as illustrated in FIG. 4A, upon returning to the top layer 520, the weft thread 400 passes above warp thread 202(*cc*), below warp thread 202 (*ee*), and above warp thread 202(*gg*) before exiting the top layer 530 and returning to the intermediate layer 520. Such a configuration provides that one or more warp threads 200 of the top layer 510 are interwoven and situated between the flexible reinforcing member 300(*b*) and the top side 102.

In the illustrated embodiment of FIG. 4A, during this first pass, after exiting the top layer 530 between the flexible reinforcing member 300(*b*) and the second longitudinal edge 108, the weft thread 400 returns to the intermediate layer 520, and thereafter transitions between warp threads 200 of the top and intermediate layers at least once. Such a configuration provides that one or more warp threads 200 from each of the top and intermediate layers are captured by the weft thread 400 and are situated between the second longitudinal edge 108 and the flexible reinforcing member 300 (*b*).

Referring now to FIG. 4B, after transitioning between the warp threads of the top and intermediate layers at least once while situated between the flexible reinforcing member 300(*b*) and the second longitudinal edge 108, the weft thread 400 makes a second pass, transitioning from the second longitudinal edge 108 to the first longitudinal edge 106. In one embodiment, the second pass is a return trip of the weft thread 400 from the second longitudinal edge 108 to the first longitudinal edge 106, wherein the path of the weft thread 400 during the second pass is the mirror image of the path of the weft thread 400 during the first pass.

Specifically, in the illustrated embodiment of FIG. 4B, during the second pass, and while being situated between the second longitudinal edge 108 and flexible reinforcing member 300(*b*), the weft thread 400 travels through the warp threads 200 of the intermediate and bottom layers one or more times such that one or more warp threads 200 from each of the intermediate and bottom layer are captured by the weft thread 400 and are situated between the second longitudinal edge 108 and the flexible reinforcing member 300(*b*). For example, as illustrated in FIG. 4b, while situated between the second longitudinal edge 108 and the flexible reinforcing member 300(*b*), the weft thread 400 passes above warp thread 202(*ii*) of the intermediate layer 520. Thereafter, weft thread returns to the bottom layer 510.

During this second pass, while still situated between the second longitudinal edge 108 and the second flexible reinforcing member 300(*b*), the weft thread 400 travels across a plurality of the warp threads 200 of the bottom layer 510 before exiting the bottom layer 510 and again interweaving one or more warp threads of the intermediate layer 520 with one or more warp threads 200 of the bottom layer 510. For example, as illustrated in FIG. 4B, upon returning to the bottom layer 510, the weft thread 400 passes below warp thread 202(*ee*), then above warp thread 202(*cc*), below warp thread 202(*aa*), above warp thread 202(*y*), and below warp thread 202(*v*) before exiting the bottom layer 510 and returning to the intermediate layer 520. Such a configuration provides that one or more warp threads 200 of the bottom layer 510 are interwoven and situated between the flexible reinforcing member 300(*b*) and the bottom side 104.

In the illustrated embodiment of FIG. 4B, during this second pass, after exiting the bottom layer 510, and while situated between the plurality of flexible reinforcing members 300(*a*) and 300(*b*), the weft thread 400 returns to the intermediate layer 520 and interweaves one or more warp threads 202 of the intermediate layer with one or more warp threads 202 of the bottom layer 510. In one embodiment, after returning to the intermediate layer 520 while situated between the plurality of flexible reinforcing members 300(*a*) and 300(*b*), weft thread 400 transitions between warp threads 200 of the top and intermediate layers at least once. Thereafter, and while still situated between the plurality of flexible reinforcing members 300(*a*) and 300(*b*), the weft thread 400 returns to the bottom layer 510. The weft thread 400 then travels through a plurality of the warp threads 200 of the bottom layer 510 before exiting the bottom layer 510 and returning to the intermediate layer 520. For example, as illustrated in FIG. 4B, upon returning to the bottom layer 510, the weft thread 400 passes below warp thread 202(*cj*), above warp thread 202(*h*), and below warp thread 202(*f*), above warp thread 202(*d*), and below warp thread 202(*a*) before exiting the bottom layer 510 and returning to the intermediate layer 520. Such a configuration provides that one or more warp threads 200 of the bottom layer 510 are interwoven and situated between the flexible reinforcing member 300(*a*) and the bottom side 104.

In the illustrated embodiment of FIG. 4A, during this first pass, after exiting the bottom layer 510 between the flexible reinforcing member 300(*a*) and the first longitudinal edge 106, the weft thread 400 returns to the intermediate layer 520, and thereafter transitions between warp threads 200 of the intermediate and bottom layers at least once. Such a configuration provides that one or more warp threads 200 from each of the bottom and intermediate layers are captured by the weft thread 400 and are situated between the first longitudinal edge 106 and the flexible reinforcing member 300(*a*).

While the above-discussed embodiments and the illustrations of FIGS. 2A-4B reference three warp threads situated above and below each of the flexible reinforcing members 300, it should be appreciated that any number of warp threads may be situated above and below each of the flexible reinforcing members 300 without departing from the scope of the present application. Similarly, it is within the spirit and scope of the present disclosure to include differential numbers of warp threads above and below each flexible reinforcing member. Alternatively or additionally, it is within the spirit and scope of the present disclosure to include differential numbers of warp threads from one flexible reinforcing member to another.

Additionally, while the above-discussed embodiments and the illustrations of FIGS. 2A-4B reference an intermediate layer comprised of warp threads having common material properties, in various other alternative embodiments, the intermediate layer 520 includes a first warp thread having a first material property (e.g., a first abrasion resistance) and a second warp thread having a second, different material property (e.g., a second, different abrasion resistance). In one example alternative embodiment, and with reference to FIGS. 4A and 4B, one or more of warp threads 202(*a*)-202(*l*) are replaced with warp threads similar to warp threads 204(*a*)-204(*l*) such that flexible reinforcing members 300(*a*) and 300(*b*) are more partially surrounded by (if not completely surrounded by) an increased quantity of warp threads 204 having an increased abrasion resistance. Such a configuration provides for a flexible reinforced strap 100 having an increased resistance to abrasion.

Additionally, while the above-discussed embodiments and the illustrations of FIGS. 2A-3B reference a single intermediate layer 520, it should be appreciated that multiple intermediate layers may be employed without departing from the spirit and scope of the present disclosure. That is, in various alternative embodiments, the flexible reinforced strap includes a top layer, a bottom layer, and a plurality of intermediate layers situated between the top layer and the bottom layer. By providing for a plurality of intermediate layers (or an increased quantity of warp threads situated in the intermediate layer), the thickness of the flexible reinforced strap may be adjusted to accommodate different flexible reinforcing members having different thicknesses or cross-sectional profiles.

Additionally, any desired number of warp threads 200 may be situated between a flexible reinforcing member 300 and a corresponding one of the longitudinal sides without departing from the spirit and scope of the present disclosure. Likewise, any desired number of warp threads 200 may be situated between the flexible reinforcing members 300 without departing from the spirit and scope of the present disclosure.

Finally, while a plurality of flexible reinforcing members 300(*a*) and 300(*b*) are referenced in the above-discussed embodiments and the illustrations of FIGS. 2A-3B, any number of flexible reinforcing members (one or more), may be employed without departing from the spirit and scope of the present disclosure. In such embodiments, the above-discussed path 500 (or 600) may be applied in accordance with the incorporation of any number of flexible reinforcing members 300, as would be appreciated by one of skill in the art.

Aspects of the present invention have been described by way of example only and it should be appreciated that modifications and additions may be made thereto without departing from the scope thereof.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A flexible reinforced strap having a first longitudinal edge and a second longitudinal edge, the flexible reinforced strap comprising:
    a plurality of layers, the plurality of layers including:
    a first side layer including a plurality of first warp threads,
    a second side layer including a plurality of second warp threads, and
    at least one intermediate layer situated between the first side layer and the second side layer, the at least one intermediate layer including a flexible reinforcing member extending in a warp direction and a plurality of third warp threads, and
    a weft thread, the weft thread being interwoven with one or more of the warp threads of each of the plurality of layers to form the flexible reinforced strap, wherein in a first region defined between the first longitudinal edge and the flexible reinforcing member the weft thread follows a first path that traverses between the first and second layers by extending through a first portion of the intermediate layer, and wherein in a second region defined between the second longitudinal edge and the flexible reinforcing member the weft thread follows a second path that traverses between the first and second layers by extending through a second portion of the intermediate layer, and wherein in a third region defined between the first and second regions the weft thread follows a third path different from the first and second paths that includes the weft thread being interwoven with multiple consecutive warp threads of one of the first and second side layers, such that the flexible reinforcing member is retained between the first side layer and the second side layer, and such that the flexible reinforcing member is retained between two or more of the plurality of third warp threads.

2. The flexible reinforced strap of claim 1, further including an upper face, and a lower face, wherein the weft thread is interwoven such that a first one of the plurality of third warp threads is situated between the first longitudinal edge and the flexible reinforcing member and such that a second one on the plurality of third warp threads is situated between the second longitudinal edge and the flexible reinforcing member.

3. The flexible reinforced strap of claim 1, wherein the at least one intermediate layer includes a plurality of flexible reinforcing members.

4. The flexible reinforced strap of claim 1, wherein the plurality of layers includes a plurality of intermediate layers, and at least one of the plurality of intermediate layers includes the flexible reinforcing member.

5. The flexible reinforced strap of claim 1, wherein the plurality of first warp threads and the plurality of second warp threads are made of a synthetic material.

6. The flexible reinforced strap of claim 1, wherein the first side layer includes a plurality of fourth warp threads made of a first material having a modulus and an abrasion resistance in excess of a modulus and an abrasion resistance of the first warp threads, and wherein the second side layer includes a plurality of fifth warp threads made of the first material, the modulus and the abrasion resistance of the first material exceeding a modulus and an abrasion resistance of the second warp threads.

7. The flexible reinforced strap of claim 1, wherein the first path and the second path are different paths.

8. The flexible reinforced strap of claim 6, wherein the weft thread is interwoven such that the flexible reinforcing member is situated within the intermediate layer between one or more of the fourth warp threads of the first side layer and one or more of the fifth warp threads of the second side layer.

9. The flexible reinforced strap of claim 1, wherein the flexible reinforcing member is concealed.

10. The flexible reinforced strap of claim 1, wherein the flexible reinforcing member is a multi-stranded wire cable.

11. The flexible reinforced strap of claim 10, wherein the multi-stranded wire cable is twisted.

12. The flexible reinforced strap of claim 11, wherein the multi-stranded wire cable is coated in plastic.

13. The flexible reinforced strap of claim 1, wherein the weft thread is interwoven with the plurality of warp threads such that the flexible reinforced strap has a thickness and a width greater than the thickness.

14. The flexible reinforced strap of claim 1, wherein the weft thread is a single continuous weft thread.

15. A flexible strap comprising:
    a first plurality of warp threads forming a first layer and a second plurality of warp threads forming a second layer,
    a flexible reinforcing member extending in a warp direction, and
    a single weft thread interwoven with one or more warp threads of the first plurality of warp threads and one or more warp threads of the second plurality of warp threads such that the flexible reinforcing member is situated between at least one warp thread of the first plurality of warp threads and at least one warp thread of the second plurality of warp threads, and such that at least one warp thread is situated between a first longitudinal edge of the flexible strap and the flexible reinforcing member, and such that at least one warp thread is situated between a second longitudinal edge of the flexible strap and the flexible reinforcing member, wherein in a first region defined between a longitudinal plane of the flexible reinforcing member and the first longitudinal edge the weft thread follows a first path that traverses between the first and second layers along a first side of the flexible reinforcing member, and wherein in a second region defined between the longitudinal plane of the flexible reinforcing member and the second longitudinal edge the weft thread follows a second path that traverses between the first and second layers along a second side of the flexible reinforcing member opposite the first side, and wherein in a third region defined between the first and second regions the weft thread follows a third path different from the first and second paths that includes the weft thread being interwoven with multiple consecutive warp threads of one of the first and second layers.

16. The flexible strap of claim 15, wherein one or more of the warp threads of the first plurality of warp threads are synthetic threads having a modulus and an abrasion resistance that exceeds a modulus and an abrasion resistance of each of the warp threads of the second plurality of warp threads.

17. The flexible strap of claim 15, wherein the weft thread is a single continuous weft thread.

18. The flexible strap of claim 15, wherein the first flexible reinforcing member of the third layer is a multi-stranded wire cable.

19. The flexible strap of claim 18, wherein the multi-stranded wire cable is a twisted wire cable made of stainless steel.

20. The flexible strap of claim 18, wherein the multi-stranded wire cable is coated with plastic.

\* \* \* \* \*